United States Patent [19]

Han et al.

[11] Patent Number: 5,308,381
[45] Date of Patent: * May 3, 1994

[54] AMMONIA EXTRACTION OF GOLD AND SILVER FROM ORES AND OTHER MATERIALS

[75] Inventors: Kenneth N. Han; Xinghui Meng, both of Rapid City, S. Dak.

[73] Assignee: South Dakota School of Mines & Techology, Rapid City, S. Dak.

[*] Notice: The portion of the term of this patent subsequent to May 9, 2009 has been disclaimed.

[21] Appl. No.: 46,311

[22] Filed: Apr. 15, 1993

[51] Int. Cl.$^5$ .............................................. C01G 3/14
[52] U.S. Cl. .......................................... 75/744; 75/741
[58] Field of Search .................... 75/741, 744; 423/32, 423/23

[56] References Cited

U.S. PATENT DOCUMENTS

| | | | |
|---|---|---|---|
| 3,709,681 | 1/1973 | Wilson et al. | 75/712 |
| 3,775,099 | 11/1973 | Coffield et al. | 423/22 |
| 3,778,252 | 12/1973 | Wilson | 75/722 |
| 3,826,750 | 7/1974 | Wilson | 75/722 |
| 3,957,505 | 5/1976 | Homick et al. | 75/712 |
| 3,988,415 | 10/1976 | Barr | 423/22 |
| 4,070,182 | 1/1978 | Genik-Sas-Berezowsky et al. | 75/103 |
| 4,093,698 | 6/1978 | Cardwell | 423/32 |
| 4,137,291 | 1/1979 | Cardwell et al. | 423/32 |
| 4,146,572 | 3/1979 | Cardwell et al. | 423/32 |
| 4,269,622 | 5/1981 | Kerley, Jr. | 75/103 |
| 4,319,923 | 3/1982 | Falanga et al. | 75/384 |
| 4,369,061 | 1/1983 | Kerley, Jr. | 75/103 |
| 4,375,984 | 3/1983 | Bahl et al. | 75/97 |
| 4,557,759 | 12/1985 | McGrew et al. | 75/384 |
| 4,654,078 | 3/1987 | Perez et al. | 423/27 |
| 4,684,404 | 8/1987 | Kalocsai | 75/118 |
| 4,980,134 | 12/1990 | Butler | 423/27 |
| 5,114,687 | 5/1992 | Han | 75/741 |
| 5,139,752 | 8/1992 | Nakao et al. | 423/27 |

OTHER PUBLICATIONS

Groenwald T., "The Dissolution of Gold in Acidic Solutions of Thiourea," Hydrometallurgy, vol. 1 (1977) 277-290.

Schulze, R. G., "New Aspects in Thiourea Leaching Precious Metals," Journal of Metals, Jun. (1984) 62-65.

Hiskey, J. B. and Atluri, V. P., "Dissolution Chemistry of Gold and Silver in Different Lixivants," Mineral Processing and Extractive Metallurgy Review, vol. 4 (1988) 95-134.

Kerley, B. J., "Recovery of Precious Metals from; Difficult Ores," U.S. Pat. No. 4,269,622 (1981).

Scheiner, B. J., "Processing of Refractory Carbonaceous Ores for Gold Recovery," Journal of Metals, vol. 23, No. 3 (1971) 37-40.

Han, K. N. and Vu, C., "Leaching Behavior of Cobalt in Ammonia Solutions," Trans, IMM. Sec. C, vol. 86 (1977) C119-125.

Han, K. N., Bhuntumkomol K. and Lawson, F., "Leaching Behavior of Metallic Nickel in Ammonia Solutions," Trans. IMM. Sec. C, vol. 89 (1980) C7-13.

Han. K. N., Vu, C. and Lawson, F., "Leaching Behavior of Cobaltous Cobalto-Cobaltic Oxides in Ammonia and in Acid Solutions," Hydrometallurgy., vol. 6 (1980) 75-87.

Han, K. N. and Bhuntumkomol, K., "Kinetics of Leaching Metallic Nickel Powder in Ammoniacal Solutions," Trans. IMM. Sec. C., vol. 91 (1982) C1-4.

(List continued on next page.)

Primary Examiner—Peter D. Rosenberg
Attorney, Agent, or Firm—Frank P. Presta

[57] ABSTRACT

Gold and silver are extracted from their elemental state or from complex ores and alloys by leaching them with a solution containing ammonia, ammonium salts and one or more oxidants. The process is particularly effective for refractory gold ores including sulfide and carbonaceous ores.

10 Claims, No Drawings

OTHER PUBLICATIONS

Han, K. N., Nebo, C. O. and Ahmad, W., "The Leaching Kinetics of Cobalt and Nickel from Aluminum-Coprecipitated Products," Met. Trans. B. 18B (1987) 635–640.

Skibsted, L. H. and Bjerrum, J., "Gold Complexes I, Robustness, Stability and Acid Dissolution of the Tetramminegold (III) ion," Acta. Chemica Scan–divica, vol. A28, No. 7 (1974) 740–746.

Skibsted, L. H. and Bjerrum, J., "Gold Complexes II, Equilibrium between Gold (I) and Gold (III) in the Ammonia System and the Standard Potentials of the Couples Involving Gold Diamminegold (I) and Tetramminegold (IV)," Acta. Chemica Scandivica, vol. A28, No. 7 (9174) 760–770.

Meng Xinghui, "E–pH Diagrams and Thermodynamic Analysis of the Au–$NH_3$–$H_2O$ System", Engineering Chemistry & Metallurgy, vol. 9, No. 3 (1988), pp. 56–60.

K. Bhuntumkomol, K. N. Han et al., "The Leaching Behavior of Nickel Oxides in Acid and in Ammonical Solutions", Hydrometallurgy, vol. 8 (1982), 147–160.

AMMONIA EXTRACTION OF GOLD AND SILVER FROM ORES AND OTHER MATERIALS

CROSS REFERENCE TO RELATED APPLICATION

This application is related to U.S. patent application Ser. No. 07/627,502 filed on Dec. 14, 1990, now U.S. Pat. No. 5,114,687, issued on May 19, 1992, which is herein incorporated by reference.

BACKGROUND OF THE INVENTION

Almost all gold currently produced from ores in the world is extracted by cyanidation leaching. Since its discovery in the 1890,s, cyanidation has been the method of choice for the extraction of gold and silver from their respective ores. This method of extraction, however, has several draw-backs. First, cyanide is an extremely toxic compound, creating the need for expensive transportation, storage and cleanup procedures. Many countries no longer allow the construction of new gold processing plants using cyanide. Furthermore, the leaching kinetics of gold and silver with cyanide is very slow. Leaching residence time is typically 2-4 days.

In addition, the gold industry in the U.S.A. and the world is facing problems associated with refractory gold-bearing deposits. One of the major challenges currently experienced by the extractive metallurgy industry is the efficient recovery of precious metals from refractory ores. The term refractory ores is used to describe a family of ores bearing precious metals where the precious metals such as gold and silver tend to be locked in various host minerals, primarily sulfide minerals and other rocks. In other cases, gold and silver are associated with carbonaceous material. When gold and silver are leached into solutions from such carbonaceous ores, dissolved gold and silver ions are reabsorbed on the surface of carbonaceous material. As a result, the overall recovery of these precious metals is reduced due to the presence of this carbonaceous material. The processing of such an ore deposit is extremely difficult and costly, and consequently, numerous gold mines worldwide have abandoned their operations due to unfavorable economic ground.

Such refractory ores are common in gold mines. Typical examples include Carlin, Cortez, Gethell, Bald Muntain, McLaughlin, Blue Range, Jardine and Mercur Mines in the U.S.A., Campbell Red Lake, Giant Yellowknife and Ker Addison Mines in Canada, Sao Bento Mineracao in Brazil and Fairview Mines in South Africa.

There have been various ways practiced in industry to treat such refractory ores. Commonly practiced techniques for sulfide ores include high temperature roasting of the ore followed by leaching, and pressure oxidation in an autoclave before the extraction of these precious metals from the ore. Numerous mining operations in South Africa still use roasting followed by a leaching process, while a number of mines in the world use a process where the ore is subjected to oxidation in an autoclave at an elevated temperature followed by the conventional cyanidation process. The cost of this two-stage process is found to be excessive and, therefore, these companies have long been looking for alternative ways of treating this refractory ore. Furthermore, the recovery of silver from such a two-stage process is known to be poor.

There have been numerous attempts made to overcome such problems associated with refractory ore processing using various chemical reagents such as thiourea[1,2], halogen chemicals[3] and ammoniacal thiosulfate[4]. However, though these chemicals are effective in dissolving precious metals in solutions, due to high reagent consumption and/or poor selectivity, these reagents are not being adopted by the precious metal industry.

In the case of carbonaceous ores, the carbonaceous material is destroyed or treated before extraction of gold is attempted. The carbonaceous material is frequently subjected to oxidation using ozones, chlorine, sodium hypochlorite, permanganates, perchlorates, and oxygen. Chlorine is currently used in the treatment of these carbonaceous ores[5]. However, due to the high cost of chlorine, it is desirable to find an alternate way of treating this ore.

Accordingly, it is an object of the present invention to provide an improved process for the extraction of gold and silver from their ores, which improved process is substantially free of one or more disadvantages of prior processes.

Another object is to provide an improved process for the extraction of gold and silver from their ores, which process does not employ cyanide.

Still another object of the present invention is to provide an improved process for the extraction of gold and silver from their ores which gives a greater yield of gold and silver than does prior processes and which is less expensive, more economical, and safer.

Additional objects and advantages of the present invention will be apparent to those skilled in the art by reference to the following detailed description.

The current invention utilizes ammonia as the key solvent to dissolve gold and silver from their solid forms, such as native state or complex ores. Ammonia is non-toxic, relatively inexpensive and easily regenerated by evaporation. Leaching of copper, nickel and cobalt using ammonia/ammonium salts has been well established. One of the applicants has had years of experience with these systems and published extensively[6-10]. Thermodynamic studies on the gold-ammine systems have been done[11,12]. However, no successful attempts have been made to extract gold and silver from various ores or other materials using ammonia. The problem has been the slow rate of dissolution when proper oxidants and sufficiently high temperature and pressure are not applied. This new technique using ammonia for the extraction of gold and silver is effective not only for the conventional sources of gold and silver but also for the refractory ores in a one stage operation with excellent recovery of gold and silver.

SUMMARY OF THE INVENTION

Gold and silver are extracted from their native state, from complex ores such as sulfide and carbonaceous refractory ores, waste recycle materials such as jewelry and waste ash by the process of this invention. The invention comprises the steps of charging these metals or metal-containing materials, such as ores or scraps, and a leach solution containing aqueous ammonia, an ammonium salt or other salts such as sodium chloride and an appropriate oxidant or combination of two or more oxidants. This charge is then subjected to a pressure vessel or an autoclave to provide a liquid-solid suspension and then the suspension is heated in order to facilitate the dissolution reaction.

The ore samples are usually reduced in size to increase the metallurgical efficiency of the extraction. Typically, the gold and silver bearing materials are ground to less than 100 mesh. Sulfides, carbonaceous ores, waste recycle materials or waste ash materials can be subjected to an upgrading process, such as froth flotation, before ammonia leaching in order to improve the overall efficiency. In the case of froth flotation, the concentrate containing predominantly sulfides or carbonaceous material and the tailing could be subjected to leaching separately.

The leaching solution consists of ammonia, an ammonium salt or sodium chloride and one or more oxidants. The preferred ammonium salts are ammonium bromide, ammonium phosphate, ammonium carbonate, ammonium iodide, and ammonium acetate. Preferably the concentration of ammonia will be 2 to 4 gram-moles per liter but may be a high as 8 gram-moles per liter. The concentration of ammonium salts is typically 0.1-2.0 but may be as high as 4 gram-moles per liter.

One of the most critical ingredients for the leaching solution is the oxidant, the oxidant dissolving gold into the solution in ionic form. Oxygen is one of the least expensive oxidants available for such systems. However, oxygen alone is insufficient to extract these metals effectively. An inorganic oxidant such as cupric, cobaltic or manganic ions should be used in this process. Cupric ion has been found to be the most effective of all. The concentration of cupric ion is preferably 1 to 15 grams per liter of solution. A combination of oxygen, hypochlorite and cupric ion at an appropriate ratio was found to be most desirable in obtaining the most efficient recovery of these materials from refractory ores.

The contents of the pressure vessel or autoclave are then heated to a temperature from about 100° C. to about 300° C., preferably between about 150° C. and about 200° C. The extraction of these materials in ammonia solutions under the conditions specified, follows the chemical reaction controlled mechanism with an Arrhenius activation energy of about 40 to 90 kJ/mole depending upon the type of ores. Therefore, the dissolution of these materials is very much sensitive to the temperature of the system. However, the operating cost would also increase significantly with the temperature.

The pressure of the system is at least the corresponding equilibrium-water pressure to the temperature employed. However, pressure increases with the amount of oxygen and/or hypochlorite used for the system. The typical pressure employed was between 689.5 kN/m$^2$(100 psi) and about 2,758 kN/m$^2$(400 psi).

When the gold and silver are leached out into a solution in particular, a solution containing gold and silver ammines, these metals could be removed from the solution via conventional techniques such as solvent extraction ion exchange, gaseous reduction, cementation, adsorption or electrowinning. The solution can be separated from residual solids using conventional techniques such as filtration.

As such herein the term "gold-silver ores" means ores of gold alone, ores of silver alone, and ores of both gold and silver, as well as simple ores and complex ores; as well as alloys of gold and silver with each other and with other metals; as well as industrial or domestic waste ash, carbonaceous ores, non-carbonaceous ores, sulfide ores and non-sulfide ores; and in particular refractory ores.

EXAMPLES

The following specific examples represent the best mode of the present invention and are illustrative but are not limitations of the current invention. It should be understood that similar results could be obtainable with other combinations of conditions other than those specifically considered in the following examples.

EXAMPLE I

Elemental gold particles of less than 10 mesh were leached in an ammonia solution under the conditions specified as follows:
  a. the concentration of free ammonia 3.0 gram-moles per liter.; that of ammonia salt 1.0 gram-moles per liter.
  b. the partial pressure of oxygen 414 kN/m$^2$(60psi).
  c. the concentration of cupric ion 10 g/l.
  d. temperature 140°-200° C.
  e. leaching time 4-5 hours.

The amounts of gold dissolved were 16.33 ppm, 42.4 ppm, 56.5 ppm and 152.2 ppm respectively at 140° C., 160° C., 180° C. and 200° C. These are undoubtedly excellent results.

EXAMPLE II

The ore used in this example was obtained from an ore deposit in California and is a refractory ore containing about 6.22 g/ton(0.2 oz/ton) of gold and very little silver. Gold is associated with sulfide minerals such as pyrite, arsenopyrite and antimony-bearing sulfides. The straight cyanidation yielded a mere 60% gold recovery after 24 hours of leaching. A number of tests using ammonia were carried out over the range of chemical conditions specified below: The leaching conditions employed were:
  a. the concentration of free ammonia 4.0 gram-moles per liter; that of ammonium salt 0.5 gram-moles per liter.
  b. the partial pressure of oxygen 483-965 kN/m$^2$(70-140 psi).
  c. the concentration of cupric ion 15 g/l.
  d. temperature 120°-170° C.
  e. leaching time 4-5 hours.
  f. solid concentration 25% by wt.

The recovery values of gold after leaching under the conditions specified above were typically 88-92%.

EXAMPLE III

The same ore sample as in Example II was used. However, froth flotation with amyl xanthate as a collector and copper sulfate as an activator was carried out to upgrade the gold content from 6.22 g/ton(0.2 oz/ton) to 31.1 g/ton(1.0 oz/ton).

Conventional cyanide leaching was performed on the concentrate. After 24 hours of leaching, the gold recovery was found to be 60%.

A number of tests were carried out over the range of chemical conditions specified below:
The leaching conditions employed were:
  a. the concentration of free ammonia 4.0 gram-moles per liter.; that of ammonium salt 0.5 gram-moles per liter.
  b. the partial pressure of oxygen 483-965 kN/m$^2$(70-140 psi).
  c. the concentration of cupric ion 15 g/l.
  d. temperature 120°C.-170° C.
  e. leaching time 4-5 hours.

f. solid concentration 25% by wt.

The recovery values of gold after leaching under the conditions specified above were typically 90 to 93%.

EXAMPLE IV

A sulfide ore whose origin was different from that of the ore used in Examples II and III was used. This ore was obtained from a mining company in Montana and the ore consists primarily of pyrite with which some gold and silver particles are believed to be associated and hence exhibits a refractory property. In this case, a flotation concentration of this sulfide refractory ore was supplied by the mining company. The contents of gold and silver of the concentration were 43.54 g/ton(1.4 oz/ton) and 311 g/ton (10.0 oz/ton), respectively.. The conventional cyanidation leaching of 24 hours yielded a mere 40 to 50% recovery of gold which was consistent with the experience of the company. Ammonia leaching with the conditions specified below was carried out.

Leaching conditions used in these experiments were:
a. the concentration of free ammonia 3.0 gram-moles per liter; that or ammonium sulfate 0.5 gram-moles per liter.
b. the partial pressure of oxygen 689.5-2758 kN/m$^2$(100-400 psi).
c. the concentration of cupric ion 15 g/l.
d. temperature 120°-170° C.
e. leaching time 4-5 hours.
f. solid concentration 10-25% by wt.

Typical extraction results are given in Table I.

TABLE I

| | % Solids | Leaching Time (hr) | % Recovery Gold | Silver |
|---|---|---|---|---|
| Run 1 | 11.1 | 4.0 | 92.4 | 85.3 |
| Run 2 | 11.1 | 5.0 | 95.7 | 97.0 |

EXAMPLE V

A carbonaceous ore obtained from a mining company in Nevada was used in this test. This ore consisted of about 7.15 g/ton(0.23 oz/ton) of gold disseminated throughout the carbonaceous as well as gangue matrix. The gangue minerals can be characterized by clays and quartz. The conventional cyanidation on this ore yielded a recovery of not more than 70%.

A number of ammonia leaching tests on this ore were performed under the experimental conditions as specified below:

Experimental conditions were:
a. the concentration of free ammonia 4.0 gram-moles per liter; that of ammonium sulfate 0.5 gram-moles per liter.
b. the partial pressure of oxygen 1034 kN/m$^2$(150 psi).
c. the concentration of cupric ion 10 g/l.
d. temperature 200° C.
e. leaching time 2-4 hours.
f. solid concentration 13% by wt.

The recovery values of gold after leaching under the conditions specified above were typically 90-92%.

EXAMPLE VI

The ore sample was provided by a mining company in Montana. The ore consists not only of sulfide minerals but also carbonaceous material. The ore sample exhibited a refractory nature. The conventional cyanidation on −200 mesh ore sample yielded a mere 45% gold recovery.

The −200 mesh ore sample was subjected to the ammonia leaching with conditions specified as below:
a. the concentration of free ammonia 4.0 gram-moles per liter; that of ammonium sulfate 0.5 gram-moles per liter.
b. the partial pressure of oxygen 1034 kN/m$^2$(150 psi).
c. the concentration of cupric ion 10 g/l.
d. temperature 190° C.
e. leaching time 2 hours.
f. solid concentration 13% by wt.

A typical recovery of gold after leaching under the conditions specified above was over 92%.

EXAMPLE VII

An industrial incinerated ash was screened and only −14 mesh size fraction was subjected to leaching tests. The ash typically contains 0.622-6.22 g/ton(0.02-0.2 oz/ton) of gold and 37.3-99.52 g/ton(1.2-3.2 oz/ton) of silver. In addition, this ash contains about 0.07% copper and 0.1% nickel. Conventional cyanide leaching was performed first on this ash. After 24 hours of leaching, the gold and silver recovery was 85% and less than 10%, respectively.

A number of tests were carried our over the range of chemical conditions specified below:
a. the concentration of free ammonia 4.0 gram-moles per liter; that of ammonium sulfate 0.5 gram-moles per liter.
b. the partial pressure of oxygen 1034 kN/m$^2$(150 psi).
c. the concentration of cupric ion 0.0-5 g/l.
d. temperature 150° C.
e. leaching time 1.5 hours.
f. solid concentration 13% by wt.

The recovery values after leaching under the conditions specified above were 90-95% gold and better than 95% silver. In addition, better than 70% copper and nickel was also recovered.

EXAMPLE VIII

About 0.63 g of elemental gold particles of less than 10 mesh were leached in an ammonia/ammonium salt solution under the conditions specified as follows:
a. the concentration of free ammonia 4.0 gram-moles per liter; that of ammonium bromide 0.5 gram-moles per liter.
b. the partial pressure of oxygen 1000 kN/m$^2$(145 psi).
c. the concentration of cupric ion 10 g/l.
d. temperature 160° C.
e. leaching time 3 hours.

The amount of gold dissolved was found to be about 82.5 ppm which is compared very favorably with about 45 ppm when ammonium sulfate was used under the similar conditions.

EXAMPLE IX

About 0.68 g of elemental gold particles of less than 10 mesh were leached in an ammonia/ammonium salt solution under the conditions specified as follows:
a. the concentration of free ammonia 4.0 gram-moles per liter; that of ammonium iodide 0.5 gram-moles per liter.
b. the partial pressure of oxygen 1000 kN/m$^2$(145 psi).

c. temperature 160° C.
d. leaching time 3 hours.

It should be noted that there was no cupric ion needed as an additional oxidant because oxidized products of iodide under the conditions investigated here have assumed the role of cupric ion. The amount of gold dissolved was found to be more than 130 ppm.

EXAMPLE X

About 0.59 g of elemental gold particles of less than 10 mesh were leached in an ammonia/ammonium salt solution under the conditions specified as follows:
a. the concentration of free ammonia 4.0 gram-moles per liter; that of ammonium phosphate 0.5 gram-moles per liter.
b. the partial pressure of oxygen 414 kN/m$^2$(60 psi)
c. the concentration of cupric ion 10 g/l.
d. temperature 160° C.
e. leaching time 3 hours.

The amount of gold dissolved was found to be about 30 ppm.

EXAMPLE XI

About 0.58 g of elemental gold particles of less than 10 mesh were leached in an ammonia/ammonium salt solution under the conditions specified as follows:
a. the concentration of free ammonia 4.0 gram-moles per liter; that of ammonium acetate 0.5 gram-moles per liter.
b. the partial pressure of oxygen 1000 kN/m$^2$(145 psi).
c. the concentration of cupric ion 10 g/l.
d. temperature 160° C.
e. leaching time 3 hours.

The amount of gold dissolved was found to be about 384 ppm which is by far the best recovery among all the ammonium salts tested to date. This could be attributed to the favorable complexation of this salt with gold under the conditions studied.

EXAMPLE XII

A carbonaceous ore obtained from a mining company in Nevada was used in this test. The ore consisted of about 0.23 oz/ton of gold disseminated throughout the carbonaceous as well as gangue matrix. The gangue minerals can be characterized by clays and quartz. The conventional cyanidation on this ore yielded a recovery of not more than 70%.

A number of ammonia leaching tests on this ore were performed under the experimental conditions as specified below:

Experimental conditions were:
a. the concentration of free ammonia 4.0 M: that of ammonium carbonate 0.5M.
b. the partial pressure of oxygen 150 psi.
c. the concentration of cupric ion 10 g/l.
d. temperature 200° C.
e. leaching time 2-4 hours.
f. solid concentration 13% by wt.

The recovery values of gold after leaching under the conditions specified above were typically 90-92%.

EXAMPLE XIII

This ore sample was provided by a mining company in Montana. The ore consists not only of sulfide minerals but also carbonaceous material. The ore sample exhibited a refractory nature. The conventional cyanidation on −200 mesh ore sample yielded a mere 45% gold recovery.

The −200 mesh ore sample was subjected to the ammonia leaching with conditions specified as follows:
a. the concentration of free ammonia 4.0 M; that of ammonium bromide 0.5 M.
b. the partial pressure of oxygen 1380 kN/m$^2$(200 psi).
c. the concentration of cupric ion 10 g/l.
d. temperature 190° C.
e. leaching time 3 hours.
f. solid concentration 13% by wt.

A typical recovery of gold after leaching under the conditions specified above was over 93%.

EXAMPLE XIV

An ore sample of less than 100 mesh was provided by a mining company in Idaho. This ore was floated with a thiol collector. The resulting concentration contained about 6.6% copper, 11.8 oz/t of gold and 10.3 oz/t of silver. This flotation concentrate was subjected to the ammonia leaching with conditions specified as below:
a. the concentration of free ammonia 5.0 M; that of ammonium carbonate 0.5M.
b. the partial pressure of oxygen 1380 kN/m$^2$(200 psi).
c. the concentration of cupric ion 10 g/l.
d. temperature 200° C.
e. leaching time 3 hours.
f. solid concentration 13% by wt.

A typical recoveries of gold, silver and copper after leaching under the conditions specified above were about 98%, 98% and 95%, respectively.

EXAMPLE XV

A flotation concentrate of a sulfide ore containing gold was provided by a mining company in Montana. This sample consists of 19.7% copper, 21 oz/t gold and 12.4 oz/t silver. This flotation concentrate of −100 mesh was subjected to the ammonia leaching with conditions specified as below:
a. the concentration of free ammonia 4.0 M; that of ammonium acetate 0.5M.
b. the partial pressure of oxygen 1380 kN/m$^2$(200 psi)
c. the concentration of cupric ion 10 g/l.
d. temperature 190° C.
e. leaching time 2-3 hours.
f. solid concentration 7% by wt.

The recoveries of gold, silver and copper were 99%, 98.9% and 99%.

DESCRIPTION OF CLAIMS

It should be mentioned that this invention is not to be regarded as limited to the expressed procedure or materials set forth. The above detailed examples are given only by way of illustration and to aid in clarifying the invention. The specific details are not essential to the invention except insofar as they are expressed by way of limitation in the following claims. It is intended to claim all novelty inherent in the invention as broadly as is permissible in view of the prior art.

REFERENCES

1. Groenewald T., "The Dissolution of Gold in Acidic Solutions of Thiourea," Hydrometallurgy, Vol. 1 (1977) 277-290.
2. Schulze R. G., "New Aspects in Thiourea Leaching Precious Metals," Journal of Metals, June (1984) 62-65.

3. Hiskey, J. B. and Atluri, V. P., "Dissolution Chemistry of Gold and Silver in Different Lixivants," Mineral Processing and Extractive Metallurgy Review, Vol. 4 (1988) 95-134.
4. Kerley, B. J., "Recovery of Precious Metals from Difficult Ores," U.S. Pat. No. 4,269,622 (1981).
5. Scheiner, B. J., "Processing of Refractory Carbonaceous Ores for Gold Recovery," Journal of Metals, Vol. 23, No. 3 (1971) 37-40.
6. Han, K. N. and Vu, C., "Leaching Behavior of Cobalt in Ammonia Solutions," Trans. IMM. Sec. C, Vol. 86 (1977) C119-125.
7. Han, K. N., Bhuntumkomol K. and Lawson, F., "Leaching Behavior of Metallic Nickel in Ammonia Solutions," Trans. IMM. Sec. C, Vol. 89 (1980) C7-13.
8. Han, K. N., Vu, C. and Lawson, F., "Leaching Behavior of Cobaltous Cobalto-Cobaltic Oxides in Ammonia and in Acid Solutions," Hydrometallurgy., Vol. 6 (1980) 75-87.
9. Han, K. N. and Bhuntumkomol, K., "Kinetics of Leaching Metallic Nickel Powder in Ammoniacal Solutions," Trans. IMM. Sec. C., Vol. 91 (1982) C1-4.
10. Han, K. N., Nebo, C. O. and Ahmad, W., "The Leaching Kinetics of Cobalt and Nickel from Aluminum-Coprecipitated Products," Met. Trans. B. 18B (1987) 635-640.
11. Skibsted, L. H. and Bjerrum, J., "Gold Complexes I, Robustness, Stability and Acid Dissolution of the Tetramminegold (III) ion," Acta. Chemica Scandivica, Vol. A28, No. 7 (1974) 740-746.
12. Skibsted, L. H. and Bjerrum, J., "Gold Complexes II, Equilibrium between Gold (I) and Gold (III) in the Ammonia System and the Standard Potentials of the Couples Involving Gold Diamminegold (I) and Tetramminegold (IV)," Acta. Chemica Scandivica, Vol. A28, No. 7 (9174) 760-770.

We claim:

1. A process for extracting elemental gold and elemental silver from gold-silver ores comprising the steps of:
   I. suspending the gold-silver ore in an aqueous leach solution comprising:
      from about 2 to about 8 gram-moles per liter of ammonia;
      from about 0.1 to 2 gram-moles of ammonia salts selected from the group consisting of ammonium iodide, ammonium phosphate, ammonium bromide, ammonium carbonate, ammonium acetate and mixtures thereof; and
      an effective amount of an oxidant selected from the group consisting of cupric ions, manganic ions, oxygen, ozone, hypochlorite, hydrogen peroxide and mixtures thereof; thereby forming a suspension; and
   II. charging the suspension to a reaction zone; and
   III. heating the suspension in the reaction zone to a temperature of about 100° C. to 300° C. and a pressure of about 689.5 (100 psi) to 6895 kN/m² (1000 psi) thereby forming a leach solution containing gold-ammine and silver-ammine; and
   IV. recovering the elemental gold and silver from the leach solution.

2. The process of claim 1 wherein the ammonia is present in the solution at a level from about 1 to about 8 gram-moles per liter of solution.

3. The process of claim 1 wherein the temperature in the reaction zone is maintained for a period of from about 0.5 hours to about 5 hours.

4. The process of claim 1 wherein the oxidant is oxygen present in the reaction zone at a partial pressure of from about 101.4 kN/m² (14.7 psi) to 2758 kN/m² (400 psi).

5. The process of claim 1 wherein the oxidant is supplied by cupric ions in a concentration from about 1 to about 15 grams per liter of solution.

6. A process of extracting elemental gold and elemental silver from goldsilver ores comprising the steps of:
   I. grinding the gold-silver ores to produce particulate ore which passes through a No. 100 U.S. Sieve; and
   II. mixing the particulate ore in a reaction zone with a leach solution containing:
      from about 1 to about 8 gram-moles per liter of ammonia; and
      from about 0.5 to about 2 gram-moles per liter of ammonium salts selected from the group consisting of ammonium salts selected from the group consisting of ammonium iodide, ammonium phosphate, ammonium carbonate, ammonium bromide, ammonium acetate, and mixtures thereof; and
      an effective amount of an oxidant selected from the group from the group consisting of cupric ions, manganic ions, oxygen, ozone, hypochlorite, hydrogen peroxide and mixtures thereof; and
   III. then heating the material in the reaction zone to a temperature from about 100° to about 300° C. and a pressure from about 689.5 kN/m² (100 psi) to about 6895.5 kN/m² (1000 psi) thereby forming a hot leach solution containing gold-ammine and silver-ammine; and
   IV. cooling the hot leach solution; and
   V. recovering the elemental gold and silver from the leach solution.

7. The process of claim 6 wherein the oxidant is supplied by cupric ions in a concentration from about 1 to about 15 grams per liter of solution.

8. The process of claim 6 wherein the oxidant is oxygen present in the reaction zone at a partial pressure of from about 101.4 kN/m² (14.7 psi) to 2578 kN/m² (400 psi).

9. The process of claim 6 wherein the temperature in the reaction zone is maintained for a period of from about 0.5 hours to about 5 hours.

10. A process for extracting elemental gold and elemental silver from gold-silver ores comprising the steps of:
    I. suspending the gold-silver ore in an aqueous leach solution comprising:
       from about 2 to about 8 gram-moles per liter of ammonia;
       a metal salt of 0.1 to 0.5 gram-moles per liter selected from the group consisting of metal-bromide, metal iodide, metal phosphate, metal carbonate and metal acetate; and
       from 1 to about 10 grams per liter of an oxidant selected from the group consisting of cupric ions, manganic ions, oxygen, ozone, hypochlorite, hydrogen peroxide and mixtures thereof; thereby forming a suspension; and
    II. charging the suspension to a reaction zone; and
    III. heating the suspension in a reaction zone to a temperature of about 100° to 300° C. and a pressure of about 689.5 (100 psi) to 6895 kN/m² (1000 psi) thereby forming a leach solution containing gold-ammine and silver-ammine; and
    IV. recovering the elemental gold and silver from the leach solution.

* * * * *